(12) United States Patent
Katayama et al.

(10) Patent No.: US 11,912,352 B2
(45) Date of Patent: Feb. 27, 2024

(54) MOVING BODY

(71) Applicant: HONDA MOTOR CO., LTD., Tokyo (JP)

(72) Inventors: Hirotaka Katayama, Saitama (JP); Haruhiko Nishiguchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 294 days.

(21) Appl. No.: 17/556,075

(22) Filed: Dec. 20, 2021

(65) Prior Publication Data

US 2022/0204076 A1    Jun. 30, 2022

(30) Foreign Application Priority Data

Dec. 25, 2020 (JP) ................................. 2020-217648

(51) Int. Cl.
*B62D 5/04* (2006.01)
*B62D 15/02* (2006.01)

(52) U.S. Cl.
CPC ......... *B62D 5/0481* (2013.01); *B62D 5/0463* (2013.01); *B62D 5/0466* (2013.01); *B62D 15/025* (2013.01)

(58) Field of Classification Search
CPC .. B62D 5/0463; B62D 5/0466; B62D 5/0481; B62D 5/0484; B62D 5/0487; B62D 5/049; B62D 5/0493; B62D 15/025
USPC ..................................................... 701/41, 43
See application file for complete search history.

(56) References Cited

U.S. PATENT DOCUMENTS

| 5,065,325 | A  | * | 11/1991 | Takahashi | B62D 5/049 180/404 |
| 5,992,556 | A  | * | 11/1999 | Miller | B62D 5/049 701/41 |
| 7,860,624 | B2 | * | 12/2010 | Kubota | B62D 5/0463 701/1 |
| 2016/0075370 | A1 | * | 3/2016 | Itamoto | B62D 5/0466 701/41 |
| 2019/0227546 | A1 |   | 7/2019 | Sato | |
| 2020/0005553 | A1 | * | 1/2020 | Eyerman | G07C 5/006 |
| 2022/0017141 | A1 | * | 1/2022 | Maruyama | B62D 5/0484 |
| 2022/0204075 | A1 | * | 6/2022 | Nishiguchi | B62D 5/0481 |

FOREIGN PATENT DOCUMENTS

JP    2019-127136 A    8/2019

* cited by examiner

*Primary Examiner* — Erick R Solis
(74) *Attorney, Agent, or Firm* — Paratus Law Group, PLLC

(57) ABSTRACT

A moving body includes: a steering system configured to change steering of the moving body; and a steering control device configured to control the steering of the moving body by controlling the steering system. The steering control device selectively executes first steering control for controlling the steering of the moving body and second steering control for restricting the steering of the moving body, executes the second steering control when a failure related to execution of the first steering control occurs, ends the first steering control when an operation amount of an operation member exceeds a first threshold value in the state where the first steering control is being executed, and ends the second steering control when an operation amount of the operation member exceeds a second threshold value larger than the first threshold value in a state where the second steering control is being executed.

7 Claims, 5 Drawing Sheets

MOVING BODY

CROSS-REFERENCE TO RELATED APPLICATIONS

The present application claims the benefit of priority of Japanese Patent Application No. 2020-217648, filed on Dec. 25, 2020, the content of which is incorporated herein by reference.

TECHNICAL FIELD

The present invention relates to a moving body.

BACKGROUND ART

JP-A-2019-127136 discloses a vehicle having an ACC function of performing constant speed traveling according to a target vehicle speed when there is no other preceding vehicles in a host vehicle traveling lane and performing follow-up traveling while maintaining a predetermined inter-vehicle distance when there is another preceding vehicle, an LKA function of maintaining traveling in the host vehicle traveling lane by follow-up control to a target route, an override function of stopping the ACC function by operation intervention of a driver, and a function of notifying the driver of stop and operation takeover of the ACC function and performing degeneration control of the ACC function when the LKA function fails. This vehicle has a function of, when the LKA function fails, changing an ACC override threshold value, which is a criterion for determination of the operation intervention for stopping the ACC function, to a value larger than that during normal operation of the LKA function. In this vehicle, when a steering torque, at which it is determined that the driver has performed steering with an intention of changing a course or avoiding an obstacle, is applied by operating a steering wheel, it is possible to stop the LKA control and shift to traveling by manual steering of the driver.

In JP-A-2019-127136, the LKA function is immediately stopped when the LKA function fails. However, for example, when the LKA function is immediately stopped due to a failure of the LKA function while the vehicle is traveling on an arc-shaped road, the vehicle cannot move safely along the road.

SUMMARY

An object of the present invention is to enable a safe shift to manual steering control while maintaining a traveling direction of a moving body even when a failure related to execution of steering control of the moving body occurs.

According to an aspect of the present invention, there is provided a moving body including: a steering system configured to change steering of the moving body according to an operation of an operation member; and a steering control device configured to control the steering of the moving body by controlling the steering system. The steering control device selectively executes first steering control for controlling the steering of the moving body based on a moving state of the moving body and second steering control for restricting the steering of the moving body, executes the second steering control when a failure related to execution of the first steering control occurs in a state where the first steering control is being executed, ends the first steering control when an operation amount of the operation member exceeds a first threshold value in the state where the first steering control is being executed, and ends the second steering control when an operation amount of the operation member exceeds a second threshold value larger than the first threshold value in a state where the second steering control is being executed.

According to the present invention, even when the failure related to the execution of the steering control of the moving body occurs, it is possible to safely shift to manual steering control while maintaining a traveling direction of the moving body.

DESCRIPTION OF EMBODIMENTS

Figure 1:
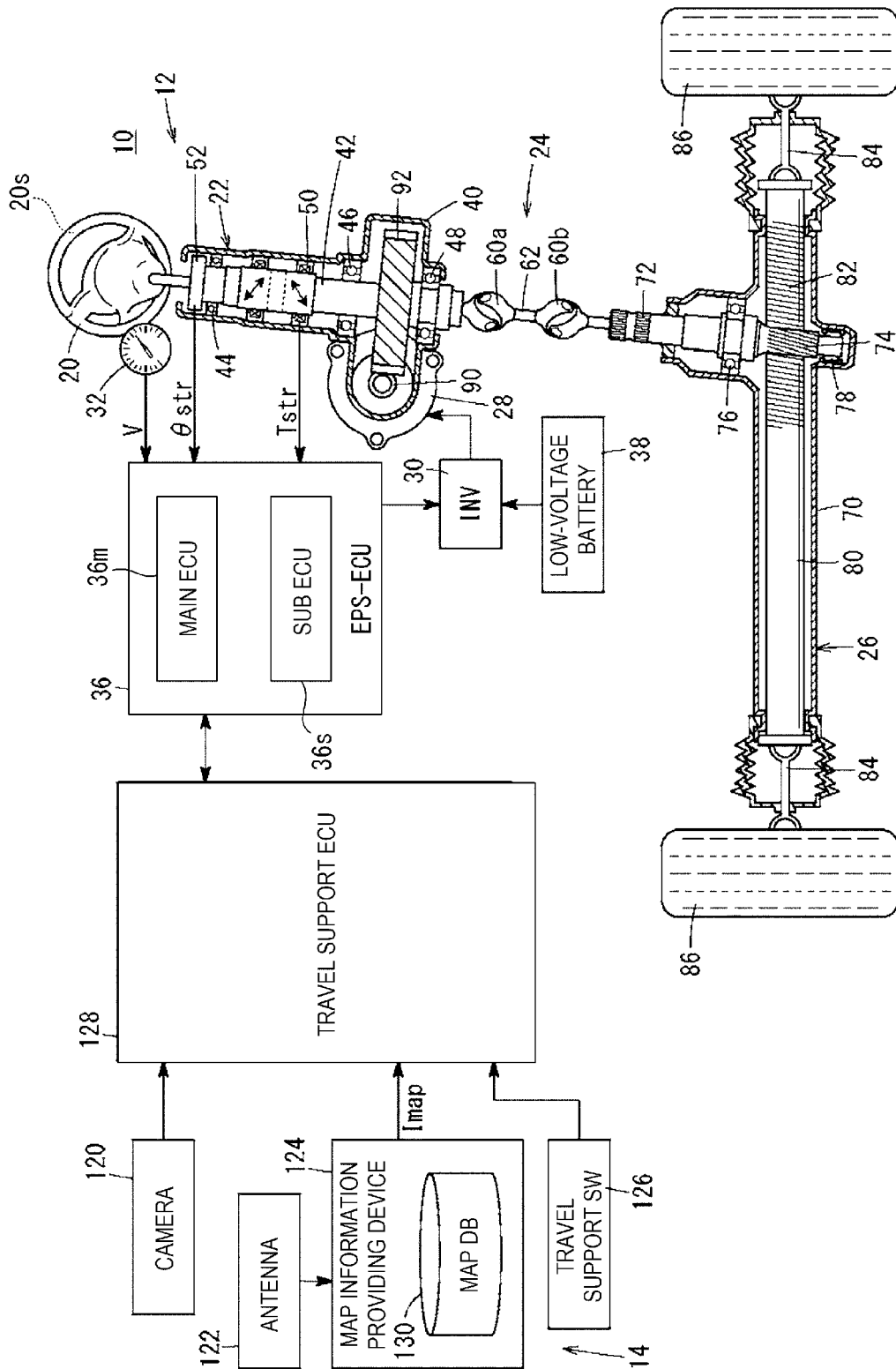
FIG. 1 is a schematic diagram showing a schematic configuration of an automobile 10 according to an embodiment of the present invention.

FIG. 1 is a schematic diagram showing a schematic configuration of an automobile 10 according to an embodiment of the present invention. As shown in FIG. 1, the automobile 10 includes a travel support system 14 and an electric power steering (EPS) device 12 connected to front wheels 86. In the automobile 10, when the travel support system 14 is operated, steering of the automobile 10 can be automatically controlled, and the automobile 10 can move along a lane without an occupant touching a steering wheel 20.

The EPS device 12 includes a steering wheel 20, a steering column 22, an intermediate joint 24, a steering gear box 26, a motor 28, an inverter 30, a vehicle speed sensor 32, an electric power steering electronic control unit 36 (hereinafter referred to as "EPS-ECU 36"), and a low-voltage battery 38. The steering wheel 20 is provided with a grip sensor 20s that detects that the steering wheel 20 is gripped, and detection information of the grip sensor 20s is sent to the EPS-ECU 36. The steering wheel 20, the steering column 22, the intermediate joint 24, the steering gear box 26, the inverter 30 and the motor 28 constitute a steering system (a steering system 100 shown in FIG. 2, which will be described later) that controls the steering of the automobile 10. The EPS-ECU 36 constitutes a steering control device that controls the steering system 100.

The steering column 22 includes a housing 40, a steering shaft 42 supported by bearings 44, 46, 48 inside the housing 40, a torque sensor 50, and a steering angle sensor 52. A "steering angle" in the present specification indicates a steering amount of the steering wheel 20 (so-called steering wheel turning angle). The steering angle and a steered angle, which is a turning angle of the front wheels 86, do not strictly coincide with each other, but have a high correlation. Therefore, maintaining the "steering angle" at any value is synonymous with maintaining the "steered angle" at a value corresponding to the above-mentioned any value.

The intermediate joint 24 includes two universal joints 60a, 60b, and a shaft portion 62 disposed therebetween.

The steering gear box 26 includes a housing 70, a pinion shaft 72 provided with a pinion 74 of a rack and pinion mechanism and supported by bearings 76, 78, a rack shaft 80 provided with rack teeth 82 of the rack and pinion mechanism, and tie rods 84.

One end of the steering shaft 42 is fixed to the steering wheel 20, and the other end thereof is connected to the universal joint 60a. The universal joint 60a connects the other end of the steering shaft 42 and one end of the shaft portion 62. The universal joint 60b connects the other end of the shaft portion 62 and one end of the pinion shaft 72. The pinion 74 of the pinion shaft 72 meshes with the rack teeth 82 of the rack shaft 80 that can reciprocate in a vehicle width direction. Both ends of the rack shaft 80 are coupled to left and right front wheels 86 (steered wheels) via the tie rods 84, respectively.

A steering torque Tstr (torque) generated by a driver operating the steering wheel 20 is transmitted to the pinion shaft 72 via the steering shaft 42 and the intermediate joint 24. Then, the steering torque Tstr is converted into thrust by the pinion 74 of the pinion shaft 72 and the rack teeth 82 of the rack shaft 80, and the rack shaft 80 is displaced in the vehicle width direction. The steered angle of the front wheels 86 can be changed by the tie rods 84 steering the front wheels 86 in accordance with displacement of the rack shaft 80. In this way, the steering system 100 of the automobile 10 is configured to be able to change the steering of the automobile 10 according to a manual operation of the occupant.

The steering shaft 42, the intermediate joint 24, the pinion shaft 72, the rack shaft 80 and the tie rods 84 constitute a manual steering system that directly transmits a steering operation (manual operation) of the driver on the steering wheel 20 to the front wheels 86.

The motor 28 is coupled to the steering shaft 42 via a worm gear 90 and a worm wheel gear 92. An output shaft of the motor 28 is coupled to the worm gear 90. The worm wheel gear 92 that meshes with the worm gear 90 is formed integrally or elastically on the steering shaft 42 itself.

The motor 28 is, for example, a three-phase AC brushless motor, but may be another motor such as a three-phase AC brush motor, a single-phase AC motor, or a DC motor. Electric power is supplied to the motor 28 from the low-voltage battery 38 via the inverter 30 controlled by the EPS-ECU 36. Then, a motor driving force Fm corresponding to the electric power is generated. The motor driving force Fm is transmitted to the rack shaft 80 via the output shaft of the motor 28, the worm gear 90, the steering shaft 42 (worm wheel gear 92), the intermediate joint 24, and the pinion shaft 72.

The torque sensor 50 detects the torque Tstr applied to the steering shaft 42 and outputs the torque Tstr to the EPS-ECU 36. The vehicle speed sensor 32 detects a vehicle speed V [km/h] of the automobile 10 and outputs the detected vehicle speed V to the EPS-ECU 36. The steering angle sensor 52 detects a steering angle θstr [degrees] indicating a steering amount of the steering wheel 20, and outputs the detected steering angle θstr to the EPS-ECU 36. The torque Tstr, the vehicle speed V and the steering angle θstr are used for feedforward control or the like in the EPS-ECU 36.

The inverter 30 has, for example, a three-phase bridge configuration, performs DC/AC conversion, converts a DC from the low-voltage battery 38 into a three-phase AC, and supplies the three-phase AC to the motor 28.

When the travel support system 14 is not operated, the EPS-ECU 36 controls the inverter 30 and the motor 28 of the steering system 100 in order to assist the steering by the driver. When the travel support system 14 is operated, the EPS-ECU 36 controls the inverter 30 and the motor 28 of the steering system 100 based on a travel situation of the automobile 10, thereby executing steering control on the automobile 10 without being steered by the driver.

The EPS-ECU 36 includes two ECUs, a main ECU 36m and a sub ECU 36s. Each of the main ECU 36m and the sub ECU 36s includes at least a processor and a storage device such as a random access memory (RAM) and a read only memory (ROM). Examples of the processor include a central processing unit (CPU) that is a general-purpose processor that executes a program to execute various types of processing, a programmable logic device (PLD) that is a processor whose circuit configuration can be changed after manufacturing a field programmable gate array (FPGA) or the like, and a dedicated electric circuit that is a processor having a circuit configuration dedicated to execution of specific processing, such as an application specific integrated circuit (ASIC). More specifically, structures of these various processors are electric circuits in which circuit elements such as semiconductor elements are combined. Functions of the main ECU 36m and the sub ECU 36s will be described later.

The travel support system 14 includes a camera 120, an antenna 122, a map information providing device 124, a travel support switch 126 and a travel support electronic control device 128 (hereinafter referred to as a "travel support ECU 128").

The camera 120 is attached to inside of a front windshield in front of a rearview mirror of the automobile 10. When the travel support switch 126 is turned on, the camera 120 captures lanes on a road in front of the automobile 10 as an image. The camera 120 outputs image information related to the image to the travel support ECU 128.

The antenna 122 receives signals (GNSS signals) from a plurality of GPS satellites constituting a global navigation satellite system (GNSS), and outputs the signals to the map information providing device 124.

The map information providing device 124 specifies a current position of the automobile 10 based on output from the antenna 122, and provides the travel support ECU 128 with map information (hereinafter referred to as "map information Imap") related to the current position and surroundings thereof. The map information Imap includes curvature information of a road on which the automobile 10 is traveling, in addition to the current position of the automobile 10. The curvature information is, for example, a curvature or a curvature radius of the road. The map information including the curvature information is stored in a map information database 130 in advance.

The travel support ECU 128 includes at least a processor and a storage device such as a RAM and a ROM. The processor of the travel support ECU 128 detects the lanes on both sides of the automobile 10 from the image acquired by the camera 120. The processor of the travel support ECU 128 derives a target steering angle of the steering wheel 20 such that the automobile 10 moves, for example, at a center of a travel route sandwiched between the detected lanes on both sides. The processor of the travel support ECU 128 instructs the EPS-ECU 36 of the target steering angle such that a steering angle of the steering wheel 20 becomes the target steering angle.

Figure 2:
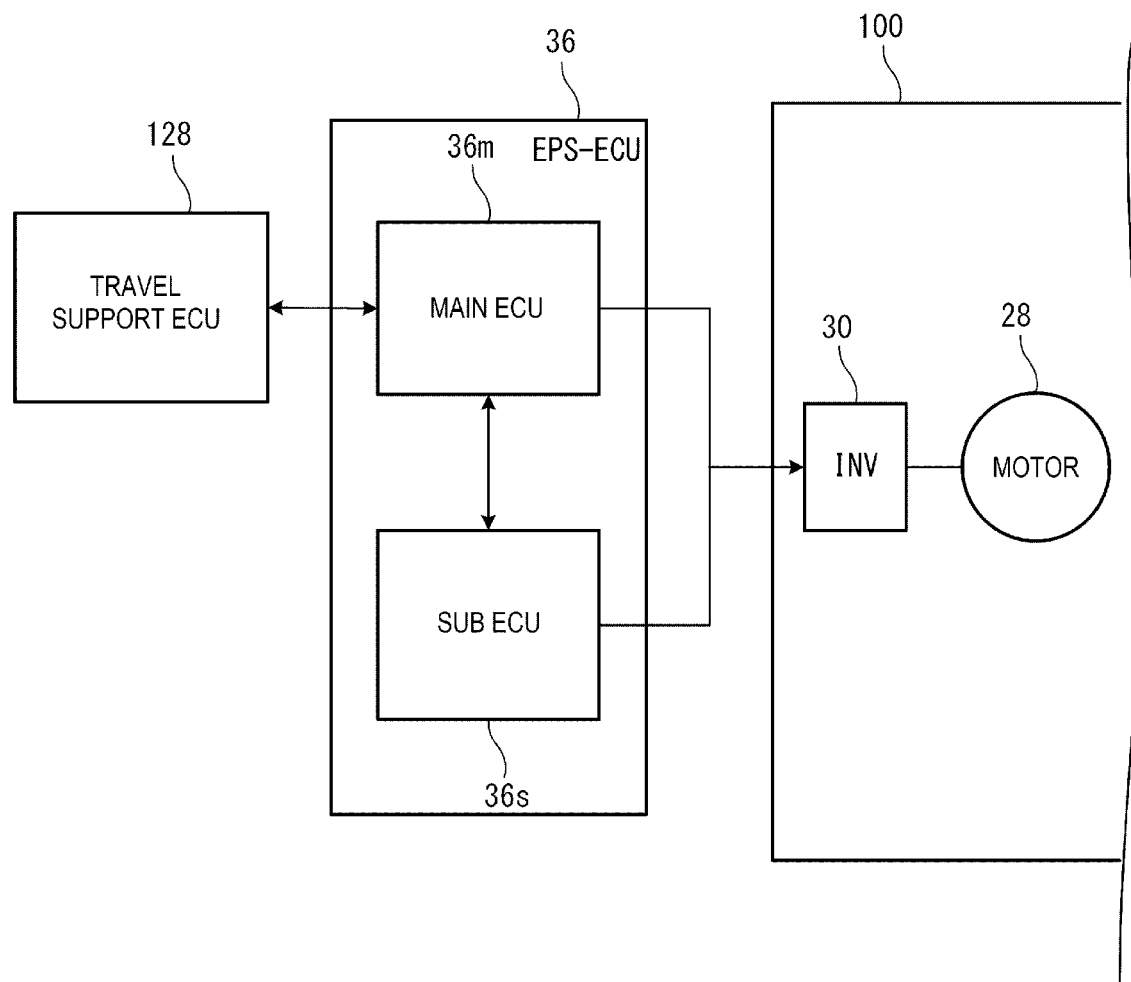
FIG. 2 is a schematic diagram showing a connection relationship among a travel support ECU, an EPS-ECU, and a steering system.

FIG. 2 is a schematic diagram showing a connection relationship among the travel support ECU 128, the EPS-ECU 36, and the steering system 100. The travel support ECU 128 and the main ECU 36m are configured to be able to communicate with each other by a communication driver (not shown). The main ECU 36m and the sub ECU 36s are configured to be able to communicate with each other by a communication driver (not shown). Each of the main ECU 36m and the sub ECU 36s is connected to the inverter 30 by a control line.

When the travel support system 14 is operated, the main ECU 36m controls a torque of the motor 28 such that the steering angle becomes the target steering angle based on the target steering angle instructed by the travel support ECU 128, a detection value (steering angle θstr) of the steering angle sensor 52, and a detection value (vehicle speed V) of the vehicle speed sensor 32. In this way, control of the motor 28 for causing the steering angle to converge to the target steering angle determined by the travel support ECU 128 according to the travel situation of the automobile 10 (the current position, information on the road on which the automobile 10 is traveling, a travel speed and the like) will be referred to as "steering angle control" below. The steering angle control constitutes first steering control.

When a failure related to execution of the steering angle control occurs in a state where the steering angle control is being executed, any one of the main ECU 36m and the sub ECU 36s executes steering restriction control of restricting the steering of the automobile 10 based on a steering state of the automobile 10 by the steering angle control before occurrence of the failure. The steering restriction control constitutes second steering control.

The steering restriction control executed by the main ECU 36m is control for maintaining the steering angle at a value immediately before the occurrence of the failure. Specifically, the main ECU 36m sets the detection value (steering angle θstr) of the steering angle sensor 52 immediately before the occurrence of the failure to a target value, and controls the torque of the motor 28 such that the steering angle converges to the target value. The main ECU 36m may set the target steering angle instructed by the travel support ECU 128 immediately before the occurrence of the failure to the target value, and execute the steering restriction control by controlling the torque of the motor 28 such that the steering angle converges to the target value. The steering restriction control executed by the main ECU 36m is hereinafter referred to as steering angle maintenance control. While the steering angle maintenance control is executed, the steering angle close to the target steering angle instructed immediately before the occurrence of the failure is maintained.

The steering restriction control executed by the sub ECU 36s is control for maintaining the torque of the motor 28 at a torque immediately before the occurrence of the failure (a drive current value input to the motor 28). The sub ECU 36s may control the motor 28 such that the torque of the motor 28 becomes a value determined based on the target steering angle instructed by the travel support ECU 128 immediately before the occurrence of the failure, and the vehicle speed V. If the target steering angle and the vehicle speed are determined without considering an influence of disturbance, the torque of the motor 28 required to achieve the target steering angle is also determined. Therefore, if the torque corresponding to the target steering angle instructed immediately before the occurrence of the failure is maintained, the steering angle close to the target steering angle is maintained while the steering restriction control is executed. The steering restriction control executed by the sub ECU 36s is hereinafter referred to as torque maintenance control.

The steering angle maintenance control variably controls the torque of the motor 28 such that the steering angle becomes constant. Therefore, more complicated processing is required as compared with control of making the torque of the motor 28 constant, such as the torque maintenance control. Therefore, it is preferable that the main ECU 36m has a calculation processing capability than higher that of the sub ECU 36s.

The "failure related to the execution of the steering angle control" described above is a failure in which the execution of the steering angle control is disabled, and corresponds to, for example, a failure of the travel support ECU 128 itself, a failure related to communication between the travel support ECU 128 and the main ECU 36m, or the like. When a failure occurs in these examples, the main ECU 36m cannot acquire information on the target steering angle. Therefore, the steering angle control cannot be executed. A failure in the control line between the main ECU 36m and the inverter 30 also corresponds to the "failure related to the execution of the steering angle control".

Figure 3:
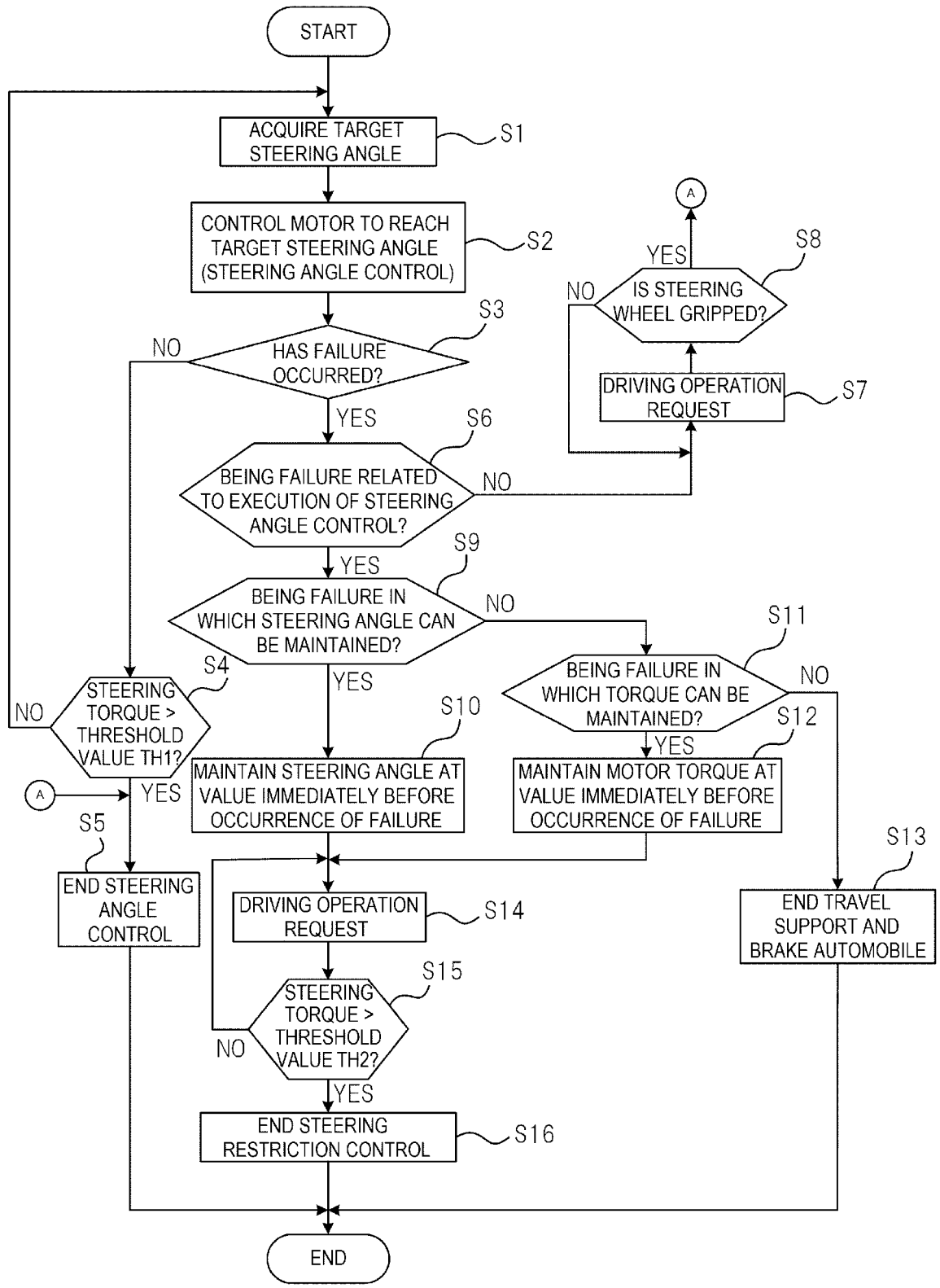
FIG. 3 is a flow and a flowchart for explaining an operation of the automobile when a travel support system is operated.

FIG. 3 is a flow and a flowchart for explaining an operation of the automobile 10 when the travel support system 14 is operated. Hereinafter, a subject of an operation performed by at least one of the main ECU 36m and the sub ECU 36s will be described as the EPS-ECU 36.

When the travel support system 14 is operated, the main ECU 36m acquires a target steering angle from the travel support ECU 128 (step S1), and controls the motor 28 such that a steering angle becomes the target steering angle (step S2).

When the travel support system 14 is operated, the EPS-ECU 36 sequentially monitors whether a failure related to the travel support system 14 and the EPS device 12 (however, a failure in the inverter 30 and the motor 28 is excluded) has occurred. When it is determined that the failure related to the travel support system 14 and the EPS device 12 has not occurred (step S3: NO), the EPS-ECU 36 determines whether a steering torque detected by the torque sensor 50 exceeds a threshold value TH1 (step S4).

When a determination result in step S4 is NO, the processing returns to step S1, and steering angle control is continued. When a determination result in step S4 is YES, the EPS-ECU 36 ends the steering angle control (step S5). When the steering angle control is ended, steering control by the manual steering system is enabled. That is, in a state where the steering angle control is executed, the driver operates the steering wheel 20 such that the steering torque exceeds the threshold value TH1, whereby the steering control is switched from automatic steering control to manual steering control.

When the EPS-ECU 36 determines in step S3 that the failure related to the travel support system 14 and the EPS device 12 has occurred (step S3: YES), the EPS-ECU 36 determines whether the occurring failure is a failure related to execution of the steering angle control (step S6).

When it is determined that the occurring failure is not the failure related to the execution of the steering angle control, in other words, the occurring failure is a failure in which the steering angle control can be continued (step S6: NO), the travel support ECU 128 makes a driving operation request to the driver (step S7). Examples of the failure in which the steering angle control can be continued include a failure in the sub ECU 36s, a failure in communication between the main ECU 36m and the sub ECU 36s, and a failure in the control line between the sub ECU 36s and the inverter 30.

The driving operation request is made using, for example, at least one of a monitor and a speaker mounted on the automobile 10.

After the driving operation request is made, the EPS-ECU 36 determines whether the steering wheel 20 is gripped based on output of the grip sensor 21 (step S8). When the steering wheel 20 is not gripped (step S8: NO), the processing of step S7 is continued, and when the steering wheel 20 is gripped (step S8: YES), the processing proceeds to step S5. In this way, when some kind of failure occurs although the steering angle control can be continued, the driver is requested to perform manual steering, and if the driver grips the steering wheel 20, the steering angle control is ended and the steering control is shifted to the manual steering control.

When the EPS-ECU 36 determines that the failure related to the execution of the steering angle control (the failure in which the steering angle control cannot be continued) has occurred (step S6: YES), the EPS-ECU 36 determines whether the occurring failure is a failure in which steering angle maintenance control can be executed (step S9). Examples of the failure in which the steering angle control cannot be continued and the steering angle maintenance control can be executed include a failure in the travel support ECU 128, a failure in communication between the travel support ECU 128 and the main ECU 36m, a failure in the sub ECU 36s, a failure in the communication between the main ECU 36m and the sub ECU 36s, and a failure in the control line between the sub ECU 36s and the inverter 30.

When it is determined that the occurring failure is a failure in which the steering angle maintenance control can be executed (step S9: YES), the steering angle maintenance control is executed by the main ECU 36m (step S10).

Figure 4:
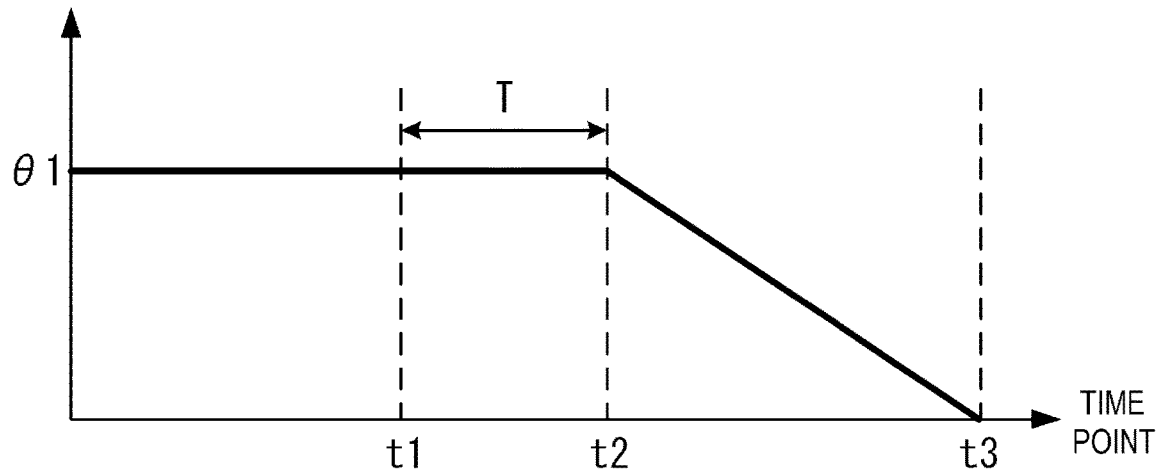
FIG. 4 is a schematic diagram showing a change in steering angle when steering angle maintenance control is executed.
Figure 5:
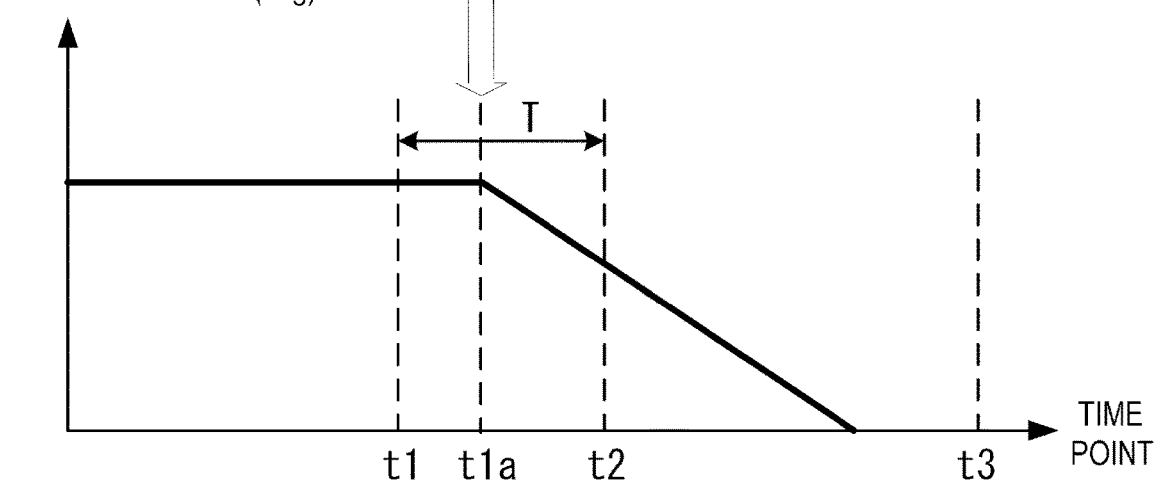
FIG. 5 is a schematic diagram showing a change in the steering angle when the steering angle maintenance control is executed.

FIG. 4 is a schematic diagram showing a change in the steering angle when the steering angle maintenance control is executed. At a time point t1 shown in FIG. 4, when a failure occurs in which the steering angle control cannot be executed and the steering angle maintenance control can be executed, the steering angle maintenance control is started, and a steering angle θ1 at a time point immediately before the time point t1 is maintained. When the steering angle maintenance control is executed in step S10, the main ECU 36m sets duration of the steering angle maintenance control to a time period T shown in FIG. 4. The time period T is, for example, a predetermined value that is set based on a time period that is assumed to be required for the driver to start an operation of the steering wheel 20 after the driver recognizes a start of the steering angle maintenance control. As will be described later, as shown in FIG. 5, when the main ECU 36m detects a manual operation on the steering wheel 20 (an operation in which the steering torque is equal to or larger than a threshold TH2) even before the time period T elapses from the start of the steering angle maintenance control, the main ECU 36m ends the steering angle maintenance control in response to the manual operation. In an example shown in FIG. 5, when the main ECU 36m detects the manual operation at a time point t1a, the main ECU 36m ends the steering angle maintenance control. The main ECU 36m gradually decreases the torque of the motor 28 such that the steering angle gradually decreases to zero at a timing (a time point t2 in an example shown in FIG. 4 and the time point t1a in the example shown in FIG. 5) at which the steering angle maintenance control is ended. In the example shown in FIG. 4, the torque and the steering angle of the motor 28 become zero at a time point t3, which is a little later than the time point t2.

When the EPS-ECU 36 determines that the occurring failure is not the failure in which the steering angle maintenance control can be executed (step S9: NO), the EPS-ECU 36 determines whether the failure that has occurred is a failure in which the torque maintenance control can be executed (step S11). The failure in which the steering angle control cannot be continued, the steering angle maintenance control cannot be executed, and the torque maintenance control can be executed is, for example, a failure in the main ECU 36m, a failure in the control line between the main ECU 36m and the inverter 30, or the like.

When it is determined that the occurring failure is the failure in which the torque maintenance control can be executed (step S11: YES), the sub ECU 36s executes the torque maintenance control (step S12).

Figure 6:
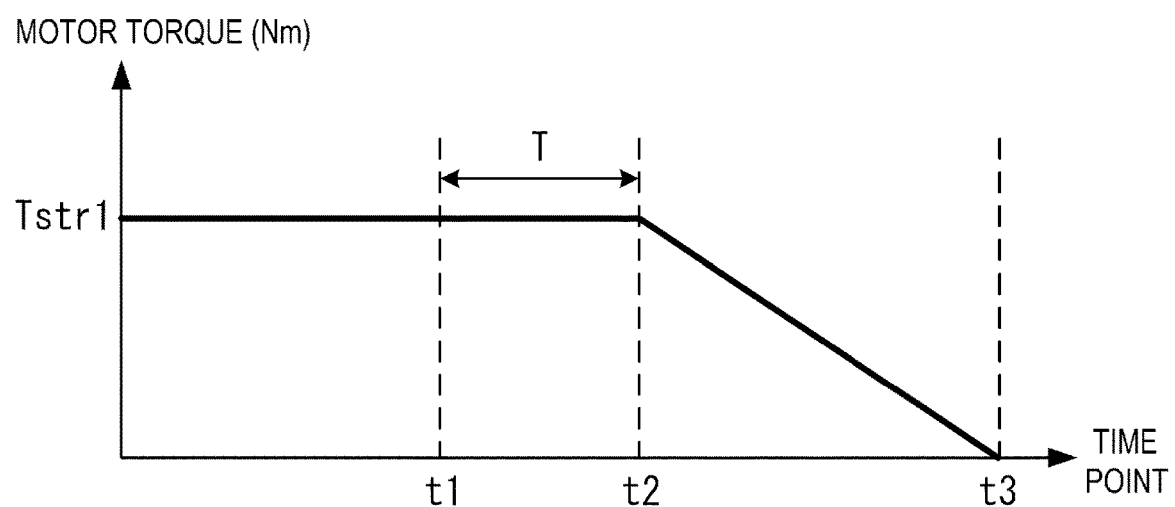
FIG. 6 is a schematic diagram showing a change in torque of a motor when the torque maintenance control is executed.

FIG. 6 is a schematic diagram showing a change in the torque of the motor 28 when the torque maintenance control is executed. At the time point t1 shown in FIG. 6, when a failure occurs in which the steering angle control and the steering angle maintenance control cannot be executed and the torque maintenance control can be executed, the torque maintenance control is started, and a torque Tstr1 of the motor 28 at a time point immediately before the time point t1 is maintained. When the sub ECU 36s executes the torque maintenance control in step S12, the sub ECU 36s sets the maximum duration of the torque maintenance control as the time period T described above. As in a case of the steering angle maintenance control, when the sub ECU 36s detects a manual operation on the steering wheel 20 even before the time period T elapses from a start of the torque maintenance control, the sub ECU 36s ends the torque maintenance control in response to the manual operation. The sub ECU 36s gradually decreases the torque of the motor 28 to zero at a timing (the time point t2 in an example shown in FIG. 6) at which the torque maintenance control is ended. In the example shown in FIG. 6, the torque of the motor 28 becomes zero at the time point t3, which is a little later than the time point t2.

When the EPS-ECU 36 determines that the occurring failure is a failure in which the torque maintenance control cannot be executed (step S11: NO, for example, a state where only the main ECU 36m is normally operated), the EPS-ECU 36 ends an operation of the travel support system 14 and instructs an integrated control unit of the automobile 10 to brake the automobile 10 (step S13). Thereby, the automobile 10 is safely stopped.

After the processing of step S10 or step S12 is started, the travel support ECU 128 makes a driving operation request to the driver (step S14). After the driving operation request is made, the EPS-ECU 36 determines whether the steering torque detected by the torque sensor 50 exceeds the threshold TH2 (step S15). The threshold value TH2 is a value larger than the threshold value TH1. When a determination result in step S15 is NO, the processing of step S14 is continued. When a determination result in step S15 is YES, the EPS-ECU 36 ends the steering angle maintenance control or the torque maintenance control that is being executed. In this way, in a state where the steering angle maintenance control or the torque maintenance control is being executed, the steering wheel 20 is operated to be larger than when the steering angle control is being executed, so that the steering control is switched to the manual steering control.

Effects of Embodiment

As described above, according to the automobile 10, when a failure related to execution of the steering angle control occurs in a state where the steering angle control is executed, the steering angle maintenance control or the torque maintenance control is executed based on a steering state (the steering angle or the torque of the motor 28) before the failure occurs. For example, when a failure occurs while the automobile 10 is traveling on an arc-shaped road (so-called curve) by the steering angle control, the steering angle maintenance control or the torque maintenance control is executed, so that the automobile 10 can move along the curve during the time period T without operating the steering wheel 20. Therefore, the automobile 10 can move safely until the driver starts the manual operation on the steering wheel 20.

According to the automobile 10, when the time period T elapses from the start of the steering angle maintenance control or the torque maintenance control, the steering of the automobile 10 is not restricted (the steering angle is maintained or the torque of the motor 28 is maintained) by the steering system. Thereby, a steering operation of the automobile 10 can be performed by the manual operation of the driver. Therefore, even when the failure occurs, the automobile 10 can safely move forward according to an intention of the driver. Even before an elapse of the time period T, the steering angle maintenance control or the torque maintenance control is ended by the driver operating the steering wheel 20. Therefore, even when the driver immediately steers the automobile, the automobile 10 can be steered under control in response to steering by the driver, and the automobile 10 can be driven according to the intention of the driver.

According to the automobile 10, even when any one of the steering angle control, the steering angle maintenance control and the torque maintenance control is executed, it is possible to end the steering angle control, the steering angle maintenance control and the torque maintenance control by operating the steering wheel 20 and to shift the steering control to the manual steering control. In order to end the steering angle maintenance control or the torque maintenance control, a steering amount larger than that required to end the steering angle control is required. Therefore, even when the driver recognizes the occurrence of the failure related to the execution of the steering angle control and the driver unintentionally operates the steering wheel 20, the steering angle maintenance control or the torque maintenance control can be continued, and a safe movement at the time of the occurrence of the failure can be realized. Even when the failure occurs, the steering angle maintenance control or the torque maintenance control is ended by the driver intentionally operating the steering wheel 20. Therefore, the steering control according to the intention of the driver can be executed.

Switching from the steering angle control to the manual steering control and switching from the steering angle maintenance control or the torque maintenance control to the manual steering control can be performed by operating the steering wheel 20, but the present invention is not limited thereto. For example, the switching may be performed by operating an accelerator pedal or a brake pedal of the automobile 10.

When a determination result in step S6 shown in FIG. 3 is YES, the EPS-ECU 36 may control input of a predetermined load to the steering shaft 42 instead of the steering angle maintenance control or the torque maintenance control. By switching from the steering angle control to this control at the time of the occurrence of the failure, the steering of the automobile can be maintained to some extent, and a safe movement at the time of the occurrence of the failure can be realized.

In step S15 shown in FIG. 3, the EPS-ECU 36 may execute the processing of step S16 when at least one of the following conditions C1 to C6 is satisfied in addition to a condition that the steering torque exceeds the threshold TH2.

Condition C1: A predetermined time period has elapsed since occurrence of a failure related to execution of the steering angle control.

Condition C2: A steering direction by the driver coincides with a steering direction by the steering angle maintenance control or the torque maintenance control.

Condition C3: The driver is gazing at a traveling direction of the automobile 10.

Condition C4: The driver is gripping the steering wheel 20.

Condition C5: Consciousness of the driver is suitable for driving.

Condition C6: A posture of the driver is suitable for driving.

The conditions C3, C5, C6 can be determined by using information on a camera that monitors the driver provided in the automobile 10. The condition C4 can be determined based on detection information of the grip sensor 20s. The conditions C3 to C6 constitute a predetermined condition.

Alternatively, when the determination result in step S15 shown in FIG. 3 is YES, the EPS-ECU 36 determines whether the condition C2 is satisfied, and when the condition C2 is satisfied, the EPS-ECU 36 executes the processing in step S16. On the other hand, when the condition C2 is not satisfied (when the steering direction by the driver is different from the steering direction by the steering angle maintenance control or the torque maintenance control), the EPS-ECU 36 may further determine whether the steering torque exceeds a threshold value TH3 that is larger than the threshold value TH2. When the steering torque exceeds the threshold value TH3, the EPS-ECU 36 may execute the processing of step S16, and when the steering torque is equal to or smaller than the threshold value TH3, the EPS-ECU 36 may return the processing to step S14.

When the determination result in step S6 shown in FIG. 3 is NO, the automobile 10 may return the processing to step S1 to continue the steering angle control without executing step S7 and step S8.

(First Modification of Steering Angle Maintenance Control or Torque Maintenance Control)

Instead of setting the steering angle immediately before the occurrence of the failure as the target steering angle used in the steering angle maintenance control, the main EC U 36m may set a representative value of the steering angle detected by the steering angle sensor 52 during a predetermined period from a timing of the occurrence of the failure as the target steering angle used in the steering angle maintenance control. The representative value of the steering angle in the predetermined period is, for example, an average value of all the steering angles detected in the predetermined period, a median value of all the steering angles detected in the predetermined period, or the like.

Instead of maintaining the torque of the motor 28 immediately before the occurrence of the failure, the sub ECU 36s may set a representative value of the torque of the motor 28 during a predetermined period from the timing of the occurrence of the failure as a torque used in the torque maintenance control. The representative value of the torque in the predetermined period is, for example, an average value of all the torques in the predetermined period, a median value of all the torques in the predetermined period, or the like.

In this way, by setting the steering angle or the torque maintained after the occurrence of the failure as the representative value of the steering angle or the representative value of the torque in the predetermined period immediately before the occurrence of the failure, even when there is an instantaneous fluctuation in the steering angle immediately before the occurrence of the failure, an influence of the fluctuation can be eliminated. Thereby, the steering angle or the torque can be prevented from greatly changing before and after the occurrence of the failure with high accuracy, and the automobile 10 can move safely along the road.

(First Modification of Automobile)

The EPS-ECU 36 may have a configuration in which the sub ECU 36s is omitted. In this case, when the target steering angle cannot be acquired from the travel support ECU 128 and the steering angle control cannot be continued in a state where the main ECU 36m is executing the steering angle control, the main ECU 36m executes the steering angle maintenance control. Even with this configuration, the automobile 10 can move along the road for a certain period without operating the steering wheel 20 after the occurrence of the failure.

(Second Modification of Automobile)

The main ECU 36m may be removed from the EPS-ECU 36, and the travel support ECU 128 and the sub ECU 36s may be communicably connected to each other. In this case, the sub ECU 36s executes torque control for controlling the torque of the motor 28 instead of the steering angle control. The torque control is control in which a torque instruction value (drive current value) required for realizing a target steering angle is obtained based on the target steering angle instructed by the travel support ECU 128 and the vehicle speed V of the automobile 10, and the drive current value is supplied to the motor 28. The torque control constitutes first steering control. When the target steering angle cannot be acquired from the travel support ECU 128 and the torque control cannot be continued, the sub ECU 36s executes the torque maintenance control described above. Even with this configuration, the automobile 10 can move along the road for a certain period without operating the steering wheel 20 after the occurrence of the failure.

(Third Modification of Automobile)

The EPS-ECU 36 and the travel support ECU 128 are separate processors, and may be configured by the same processor.

(Fourth Modification of Automobile)

The EPS-ECU 36 may change a value of the steered angle of the front wheels 86 with respect to the steering torque when the manual operation on the steering wheel 20 is detected during the steering angle control and when the manual operation on the steering wheel 20 is detected during the steering angle maintenance control or the torque maintenance control. For example, when the manual operation on the steering wheel 20 is detected during the steering angle control, a relationship between the steering torque and the steered angle may be 1:1, and when the manual operation on the steering wheel 20 is detected during the steering angle maintenance control or the torque maintenance control, the relationship between the steering torque and the steered angle may be 1:0.5. It is preferable that the steering angle maintenance control or the torque maintenance control is executed only for a predetermined time period after a shift to the manual steering, and thereafter, the same control as that during the steering angle control (control in which the relationship between the steering torque and the steered angle is 1:1) is executed.

In the above description, the automobile has been exemplified as a moving body. However, embodiments of the moving body of the present invention are not limited to automobiles, and may be ships, aircrafts or the like that do not have driving wheels. In a case of an aircraft, a system for operating a moving wing constitutes a steering system. In a case of a ship, a system for operating a rudder constitutes a steering system.

As described above, at least the following matters are described in the present specification. Although corresponding components or the like in the above-described embodiments are shown in parentheses, the present invention is not limited thereto.

(1) A moving body including: a steering system (a steering wheel 20, a steering column 22, an intermediate joint 24, a steering gear box 26, an inverter 30 and a motor 28) configured to change steering of the moving body according to an operation of an operation member; and a steering control device (EPS-ECU 36) configured to control the steering of the moving body (automobile 10) by controlling the steering system, wherein the steering control device selectively executes first steering control (steering angle control) for controlling the steering of the moving body based on a moving state of the moving body and second steering control (steering angle maintenance control, torque maintenance control) for restricting the steering of the moving body, executes the second steering control when a failure related to execution of the first steering control occurs in a state where the first steering control is being executed, ends the first steering control when an operation amount of the operation member (the steering wheel 20, an accelerator pedal or a brake pedal) exceeds a first threshold value (threshold value TH1) in the state where the first steering control is being executed, and ends the second steering control when an operation amount of the operation member exceeds a second threshold value (threshold value TH2) larger than the first threshold value in a state where the second steering control is being executed.

According to (1), the second steering control is executed when the failure related to the execution of the first steering control occurs in the state where the first steering control is being executed. For example, it is possible to maintain a steering state before occurrence of the failure by the second steering control, and it is possible to maintain a traveling direction of the moving body even when the failure occurs in which the first steering control cannot be continued. Regardless of whether the first steering control or the second steering control is executed, it is possible to end the first steering control or the second steering control by operating the operation member, and to shift steering control to, for example, manual steering control. In order to end the second steering control, an operation amount larger than that in a case of ending the first steering control is required. Therefore, even when an occupant recognizes the occurrence of the failure related to the execution of the first steering control and the occupant unintentionally operates the operation member, the second steering control can be continued, and a safe movement at the time of the occurrence of the failure can be realized. Even at the time of the occurrence of the failure, the second steering control is ended by the occupant intentionally operating the operation member. Therefore, the moving body can move according to an intention of the occupant.

(2) The moving body according to (1),
wherein the steering control device ends the second steering control when a predetermined time period has elapsed from a start of the second steering control and the operation amount exceeds the second threshold value.

According to (2), even when the operation amount of the operation member exceeds the second threshold value, the second steering control is continued for the predetermined time period after the occurrence of the failure. Then, after the predetermined time period has elapsed, it is possible to end the second steering control by the operation of the operation member, and to shift the steering control to the manual steering control. Therefore, a safe movement by the second steering control can be realized for the predetermined time period after the occurrence of the failure, and thereafter, a safe movement according to the operation of the occupant can be realized.

(3) The moving body according to (1) or (2),
wherein the steering control device determines whether a state of an occupant satisfies a predetermined condition, and ends the second steering control when the predetermined condition is satisfied and the operation amount exceeds the second threshold value.

According to (3), even when the operation amount of the operation member exceeds the second threshold value, the second steering control is continued unless the occupant is in a state of satisfying the predetermined condition. Therefore, the second steering control can be continued even when the operation amount exceeds the second threshold due to an operation of the operation member that is not intended by the occupant. In this way, the steering direction can be prevented from being changed by the operation that is not intended by the occupant, and the safe movement at the time of the occurrence of the failure can be realized.

(4) The moving body according to any one of (1) to (3),
wherein the operation member is an operation element (steering wheel 20) provided in the steering system.

According to (4), the second steering control can be ended according to a manual operation on the steering system. Therefore, an operation of ending the second steering control and an operation of manually starting the steering control can be made to coincide with each other, and a series of flows from the occurrence of the failure to the manual steering control by the occupant can be smoothed.

(5) The moving body according to any one of (1) to (4),
wherein the steering control device ends the second steering control when a steering direction based on the operation of the operation member and a steering direction based on the second steering control are the same and the operation amount exceeds the second threshold value.

According to (5), the second steering control can be continued even when the occupant who has recognized the occurrence of the failure unintentionally operates the operation member in a direction opposite to the steering direction of the moving body. Therefore, the safe movement at the time of the occurrence of the failure can be realized.

(6) The moving body according to any one of (1) to (5),
wherein the steering control device ends the second steering control when the operation amount exceeds a third threshold value larger than the second threshold value in a state where the steering direction based on the operation of the operation member and the steering direction based on the second steering control are different from each other.

According to (6), even when the occupant who has recognized the occurrence of the failure unintentionally operates the operation member in the direction opposite to the steering direction of the moving body, the second steering control can be continued as long as the operation amount is not sufficiently large. Therefore, the safe movement at the time of the occurrence of the failure can be realized.

(7) The moving body according to any one of (1) to (6),
wherein the second steering control includes at least one of steered angle maintenance control (steering angle maintenance control) for maintaining a steered angle of a wheel (front wheel 86) of the moving body at a value based on a steering state of the moving body by the first steering control, and torque maintenance control for maintaining a torque of an actuator included in the steering system at a value based on the steering state of the moving body by the first steering control.

According to (7), the steered angle or the torque before the occurrence of the failure can be maintained by the second steering control. Therefore, at the time of the occurrence of the failure, the steering state according to a movement state before the occurrence of the failure can be maintained, and the safe movement according to a moving route can be realized.

The invention claimed is:

1. A moving body comprising:
   a steering system configured to change steering of the moving body according to an operation of an operation member; and
   a steering control device configured to control the steering of the moving body by controlling the steering system,
   wherein the steering control device
      selectively executes first steering control for controlling the steering of the moving body based on a moving state of the moving body and second steering control for restricting the steering of the moving body,
      executes the second steering control when a failure related to execution of the first steering control occurs in a state where the first steering control is being executed,
      ends the first steering control when an operation amount of the operation member exceeds a first threshold value in the state where the first steering control is being executed, and
      ends the second steering control when an operation amount of the operation member exceeds a second threshold value larger than the first threshold value in a state where the second steering control is being executed.

2. The moving body according to claim 1,
wherein the steering control device ends the second steering control when a predetermined time period has elapsed from a start of the second steering control and the operation amount exceeds the second threshold value.

3. The moving body according to claim 1,
wherein the steering control device determines whether a state of an occupant satisfies a predetermined condition, and ends the second steering control when the predetermined condition is satisfied and the operation amount exceeds the second threshold value.

4. The moving body according to claim 1,
wherein the operation member is an operation element provided in the steering system.

5. The moving body according to claim 1,
wherein the steering control device ends the second steering control when a steering direction based on the operation of the operation member and a steering direction based on the second steering control are the same and the operation amount exceeds the second threshold value.

6. The moving body according to claim 1, wherein the steering control device ends the second steering control when the operation amount exceeds a third threshold value larger than the second threshold value in a state where the steering direction based on the operation of the operation member and the steering direction based on the second steering control are different from each other.

7. The moving body according to claim 1, wherein the second steering control includes at least one of steered angle maintenance control for maintaining a steered angle of a wheel of the moving body at a value based on a steering state of the moving body by the first steering control, and torque maintenance control for maintaining a torque of an actuator included in the steering system at a value based on the steering state of the moving body by the first steering control.

* * * * *